US011937537B2

(12) United States Patent
Wang et al.

(10) Patent No.: US 11,937,537 B2
(45) Date of Patent: Mar. 26, 2024

(54) GRASS TRIMMER AND CONTROL METHOD FOR GRASS TRIMMER

(71) Applicant: Nanjing Chervon Industry Co., Ltd., Nanjing (CN)

(72) Inventors: Sanglong Wang, Nanjing (CN); Jianpeng Guo, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 1018 days.

(21) Appl. No.: 16/845,465

(22) Filed: Apr. 10, 2020

(65) Prior Publication Data

US 2020/0236845 A1 Jul. 30, 2020

Related U.S. Application Data

(63) Continuation of application No. PCT/CN2018/110927, filed on Oct. 19, 2018.

(30) Foreign Application Priority Data

Oct. 20, 2017 (CN) .......................... 201710985907.1
Dec. 27, 2017 (CN) .......................... 201711439441.1

(51) Int. Cl.
    A01D 34/00    (2006.01)
    A01D 34/416   (2006.01)
    A01D 75/28    (2006.01)
(52) U.S. Cl.
    CPC ......... *A01D 34/006* (2013.01); *A01D 34/416* (2013.01); *A01D 75/285* (2013.01)
(58) Field of Classification Search
    None
    See application file for complete search history.

(56) References Cited

U.S. PATENT DOCUMENTS 4,852,258 A    8/1989  Foster
5,109,607 A  * 5/1992  Everts ................ A01D 34/4162
                                                    30/276
(Continued)

FOREIGN PATENT DOCUMENTS

CN    203301992 U    11/2013
CN    104126361 A    11/2014
(Continued)

OTHER PUBLICATIONS

EPO, Examination Report issued on European patent publication No. 3679780, dated Aug. 18, 2021, 4 pages.
(Continued)

*Primary Examiner* — Hwei-Siu C Payer
(74) *Attorney, Agent, or Firm* — Greenberg Traurig, LLP

(57) ABSTRACT

A grass trimmer includes an operating device configured for a user to operate and a grass trimmer device including a grass trimmer head and a motor. The grass trimmer head includes a spool configured for a grass trimmer line to wind around and a housing formed with an accommodating cavity. When the grass trimmer is mounted with the grass trimmer line, a part of the grass trimmer line protruding outside the housing is defined as an effective part of the grass trimmer line. The grass trimmer further includes a controller configured to control the grass trimmer head to release a grass trimmer line when the grass trimmer head is mounted with the grass trimmer line and a length of the effective part is detected to be less than or equal to a preset value.

13 Claims, 12 Drawing Sheets

(56) References Cited

U.S. PATENT DOCUMENTS

| | | | |
|---|---|---|---|
| 5,276,968 | A | 1/1994 | Collins et al. |
| 2016/0345493 | A1 | 12/2016 | Ma et al. |
| 2020/0236845 | A1* | 7/2020 | Wang .................. A01D 34/008 |
| 2023/0157205 | A1* | 5/2023 | Kullberg ............ A01D 34/4162 |
| | | | 30/276 |

FOREIGN PATENT DOCUMENTS

| | | | |
|---|---|---|---|
| CN | 104663113 A | | 6/2015 |
| CN | 105850342 A | | 8/2016 |
| CN | 106993425 A | | 8/2017 |
| CN | 106993427 A | | 8/2017 |
| CN | 206506877 U | | 9/2017 |
| CN | 107996122 A | | 5/2018 |
| CN | 108617226 A | | 10/2018 |
| CN | 110149887 A | * | 8/2019 |
| DE | 102007015991 A1 | | 10/2007 |
| EP | 2798935 A1 | | 11/2014 |
| EP | 3014975 A1 | | 5/2016 |
| WO | 2017/059917 A1 | | 4/2017 |
| WO | WO 2018/077231 A1 | * | 5/2018 |

OTHER PUBLICATIONS

ISA/CN, International Search Report issued on application No. PCT/CN2018/110927, dated Jan. 30, 2019, 3 pages.
EPO, extended European search report issued on European patent publication No. 3679780, dated Dec. 7, 2020, 5 pages.

\* cited by examiner

GRASS TRIMMER AND CONTROL METHOD FOR GRASS TRIMMER

RELATED APPLICATION INFORMATION

This application is a continuation of International Application Number PCT/CN2018/110927, filed on Oct. 19, 2018, through which this application also claims the benefit under 35 U.S.C. § 119(a) of Chinese Patent Application No. CN 201710985907.1, filed on Oct. 20, 2017, and Chinese Patent Application No. CN 201711439441.1, filed on Dec. 27, 2017, each of which is incorporated herein by reference in its entirety.

TECHNICAL FIELD

The present disclosure relates to a grass trimmer and a control method for a grass trimmer, and in particular to a grass trimmer line releasing method for the grass trimmer.

BACKGROUND

As a garden tool, a grass trimmer is widely favored by a user. It is known that after the grass trimmer works for a period of time, the length of a grass trimmer line may be reduced due to wear and tear, which will reduce the range of trimming grass and greatly affect the efficiency of trimming grass. At this time, the user wants the length of the grass trimmer line to be increased. For this reason, the grass trimmer needs to perform the operation of grass trimmer line releasing. However, for the existing grass trimmer, on the one hand, it is difficult for the user to find out whether a length of the grass trimmer line satisfies the needs; on the other hand, the existing grass trimmer requires manual operation by the user to complete the grass trimmer line releasing function.

SUMMARY

In one example of the disclosure, a grass trimmer includes an operating device configured for a user to operate and a grass trimmer device including a grass trimmer head and a motor configured to drive the grass trimmer head. The grass trimmer head includes: a spool configured for a grass trimmer line winding around and capable of rotating around a first axis and a housing formed with an accommodating cavity configured to accommodate at least a part of the spool and formed with an aperture configured for the grass trimmer line to pass through. When the grass trimmer is mounted with the grass trimmer line, a part of the grass trimmer line protruding outside the housing is defined as an effective part of the grass trimmer line. The grass trimmer further includes a controller configured to control the grass trimmer head to release a grass trimmer line when the grass trimmer head is mounted with the grass trimmer line and a length of the effective part is detected to be less than or equal to a preset value.

In a further example, the grass trimmer further includes: a line feeding device configured to have a first working mode for preventing the grass trimmer head from releasing the grass trimmer line and a second working mode for allowing the grass trimmer head to release the grass trimmer line; when the line feeding device is in the first working mode, the housing is stationary relative to the spool, and the grass trimmer head is capable of trimming grass; when the line feeding device is in the second working mode, the spool rotates relative to the housing, and the grass trimmer head releases the grass trimmer line.

In a further example, the controller is connected to the motor, and the controller is at least capable of switching the grass trimmer head from the first working mode to the second working mode by controlling the motor to be accelerated by a first rotation speed at which the grass trimmer is in a normal grass trimming state.

In a further example, the grass trimmer further includes: a detection device configured to detect a characterization parameter that reflects a change in the length of the effective part when the grass trimmer line is mounted to the grass trimmer; the controller is connected to the detection device, and when the characterization parameter reflects that the length of the effective part is less than or equal to the preset value, the controller controls the grass trimmer head to release the grass trimmer line.

In a further example, a correspondence relationship between the characterization parameter and the length of the effective part is stored in the controller.

In a further example, the characterization parameter is a current flowing through the motor, or a torque of the grass trimmer line, or a noise outside the housing of the grass trimmer head.

In a further example, the grass trimmer further includes: a line feeding device configured to have a first working mode for preventing the grass trimmer head from releasing the grass trimmer line and a second working mode for allowing the grass trimmer head to release the grass trimmer line. The line feeding device includes: a movable block capable of rotating with rotation of the spool and sliding along a direction of a first straight line relative to the spool. The movable block is formed with an engagement portion; the housing is formed with a reception portion capable of cooperating with the engagement portion to cause the housing and the spool relatively stationary; in response to determining that the line feeding device is in the first working mode, the movable block slides to a position where the engagement portion and the reception portion cooperate with each other; in response to determining that the line feeding device is in the second working mode, the movable block slides to a position where the engagement portion and the reception portion are separated from each other.

In a further example, the reception portion is formed on an outer side of the housing facing toward the motor; the movable block is at least partially disposed outside the accommodating cavity.

In a further example, the line feeding device includes: a biasing member configured to bias the movable block to move toward the position where the engagement portion and the reception portion cooperate with each other.

In a further example, a center of gravity of the movable block and the biasing member are respectively disposed on two sides of a plane passing through the first axis and perpendicular to the first straight line.

In a further example, the grass trimmer further includes: a detection device configured to detect the length of the effective part; where the detection device is connected to the controller, and in response to determining that the length of the effective part detected by the detection device is less than or equal to the preset value, the controller controls the grass trimmer head to release the grass trimmer line.

In a further example, the grass trimmer further includes: a detection device configured to detect whether the length of the effective part is less than or equal to the preset value; where the controller is connected to the detection device, and in response to determining that the detection device detects that the length of the effective part is less than or equal to the preset value, the controller controls the grass trimmer head to release the grass trimmer line.

In a further example, a control method for a grass trimmer is provided. The grass trimmer includes a grass trimmer device, the grass trimmer device includes a grass trimmer head and a motor configured to drive the grass trimmer head to rotate, and when the grass trimmer head is mounted with a grass trimmer line, the grass trimmer line is driven to rotate to cut grass; when the grass trimmer head is mounted with the grass trimmer line, a part of the grass trimmer line protruding outside the grass trimmer head is defined as an effective part of the grass trimmer line. The control method includes steps of: detecting and determining whether a length of the effective part is less than or equal to a preset value; in response to determining that the length of the effective part is less than or equal to the preset value, controlling the grass trimmer head to release a grass trimmer line.

In a further example, when the length of the effective part is less than or equal to the preset value, the motor is controlled to accelerate from a first rotation speed to a second rotation speed to cause the grass trimmer head to release the grass trimmer line.

In a further example, the control method further includes a step of controlling the motor to decelerate from the second rotation speed to a third rotation speed.

In a further example, the third rotation speed is smaller than the first rotation speed.

In a further example, a difference between the third rotation speed and the second rotation speed is greater than a difference between the second rotation speed and the first rotation speed.

The advantage of the present disclosure is that: the grass trimmer is capable of achieving intelligent and automatic grass trimmer line releasing.

DETAILED DESCRIPTION

Figure 1:
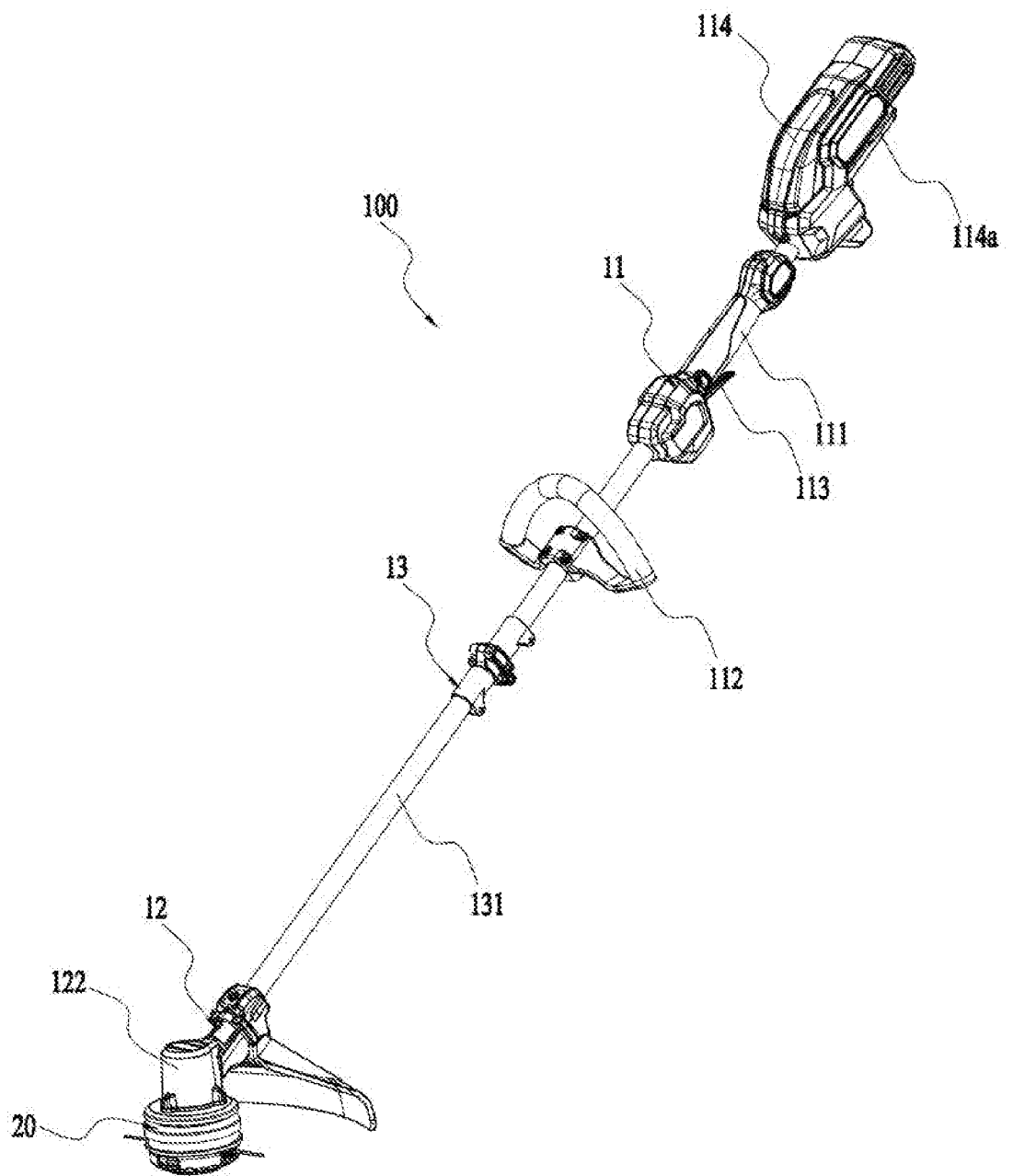
FIG. 1 is a perspective view of an example grass trimmer.

A grass trimmer 100 shown in FIG. 1 includes an operating device 11, a grass trimmer device 12, and a connecting device 13.

The operating device 11 includes a handle 111, an auxiliary handle 112, and a main switch 113. The handle 111 and the auxiliary handle 112 are respectively used by two hands of a user to hold, so that the user can operate the grass trimmer 100 more stably. The main switch 113 may be disposed on the handle 111. When the user holds the handle 111, the user can directly operate the main switch 113 to control the grass trimmer 100 to perform trimming. The operating device 11 may further include a rear housing 114 for forming a coupling portion 114a, and the coupling portion 114a is used for coupling a power supply device to power the grass trimmer 100. For example, the coupling portion 114a is capable of coupling a battery pack to power the grass trimmer 100. The handle 111 may be integrally formed with the rear housing 114, or the handle 111 may be formed separately from the rear housing 114.

Figure 2:
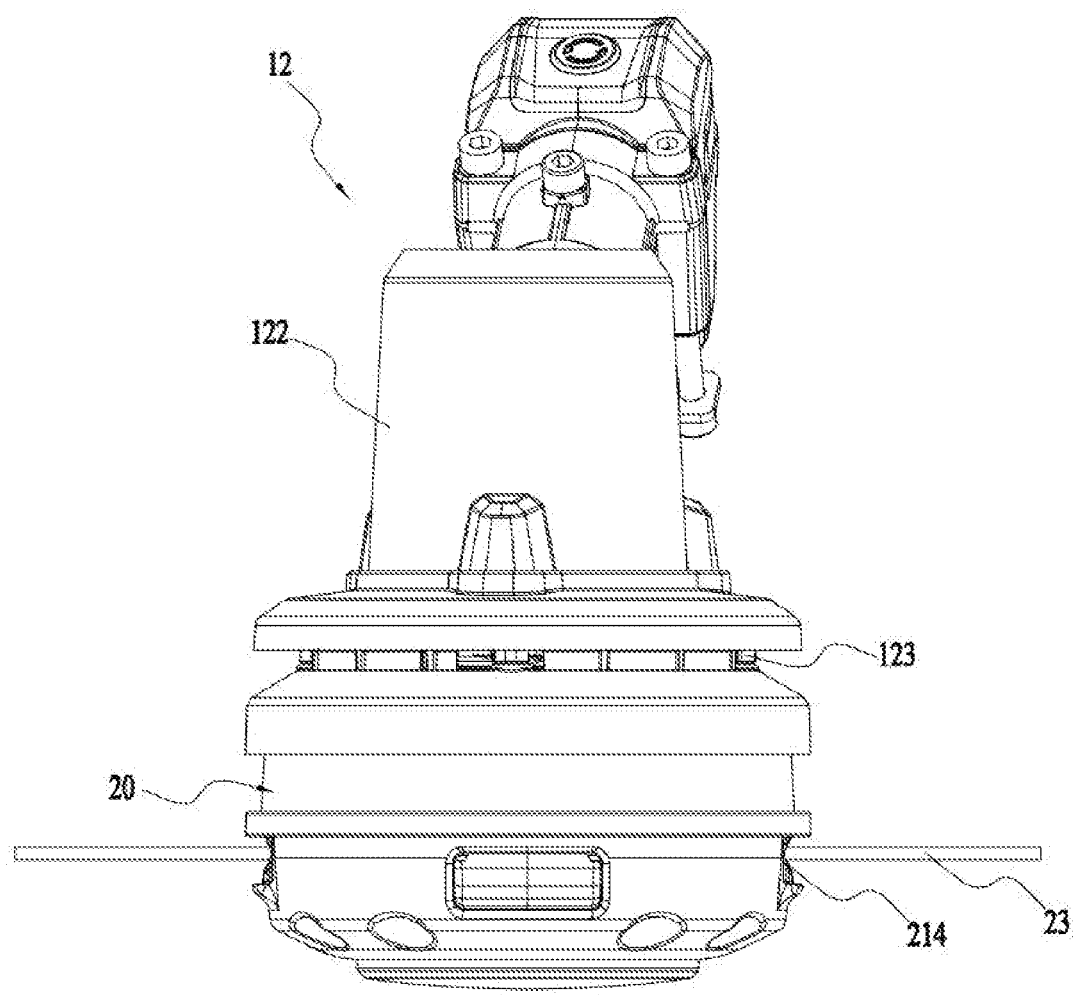
FIG. 2 is a plan view of a grass trimmer device of the grass trimmer of FIG. 1.
Figure 3:
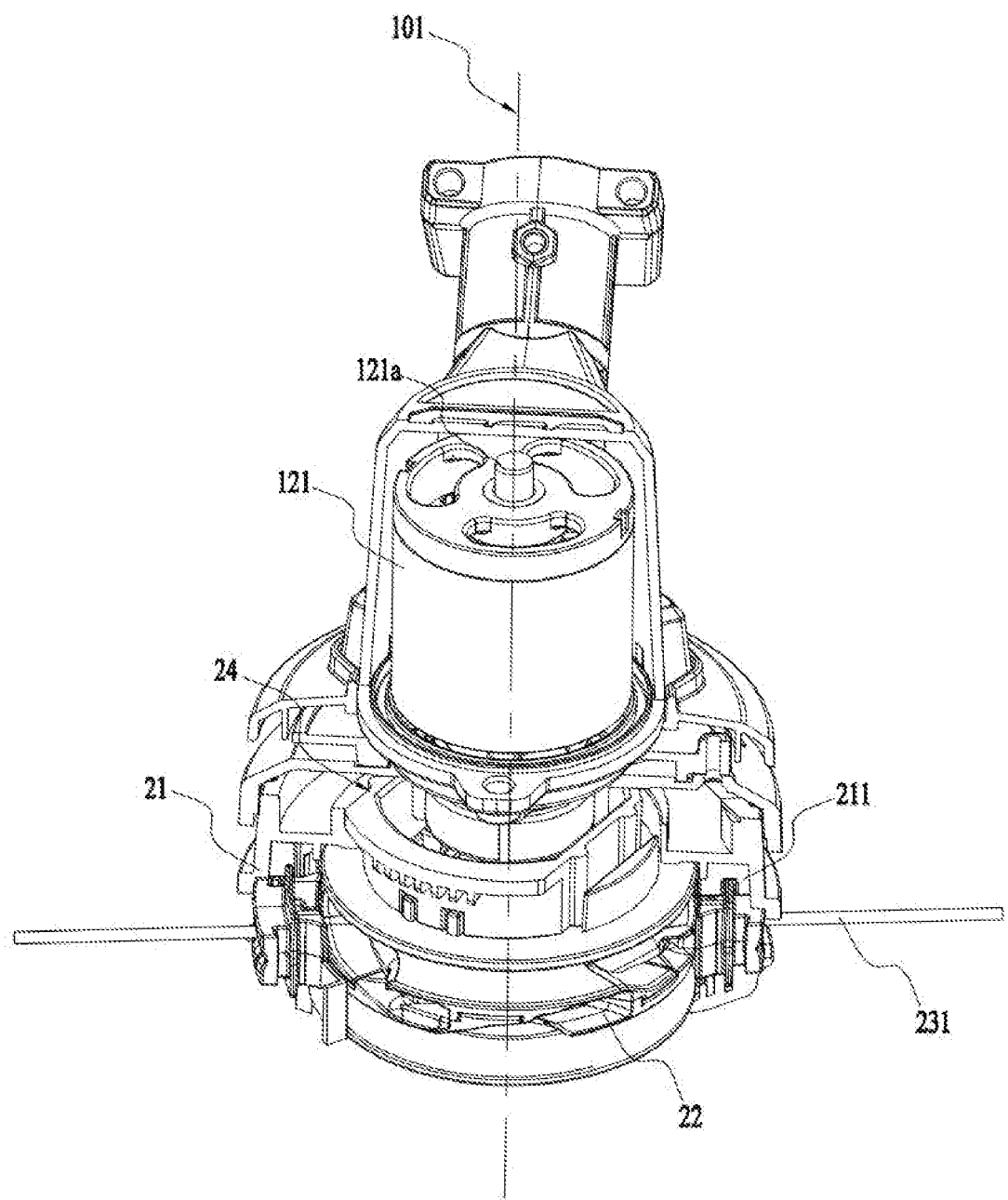
FIG. 3 is an inner view of the grass trimmer device of FIG. 2 with a motor housing and a housing being opened.
Figure 4:
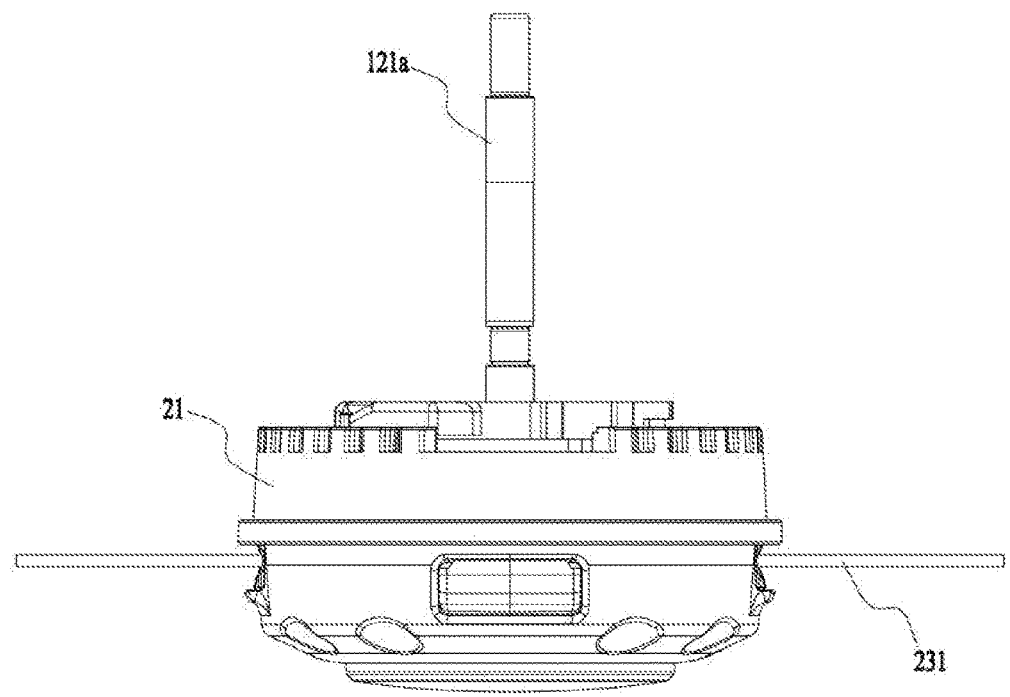
FIG. 4 is a plan view of a grass trimmer head and a motor shaft of FIG. 3.
Figure 5:
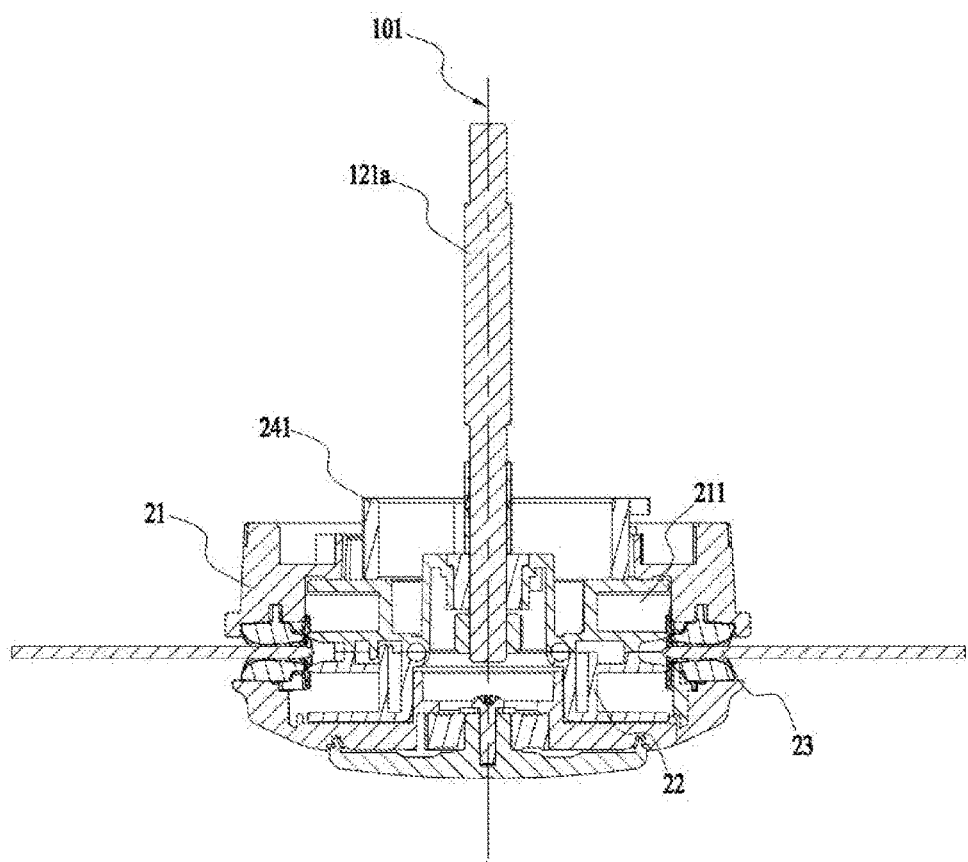
FIG. 5 is a sectional view of a structure shown in FIG. 4.
Figure 6:
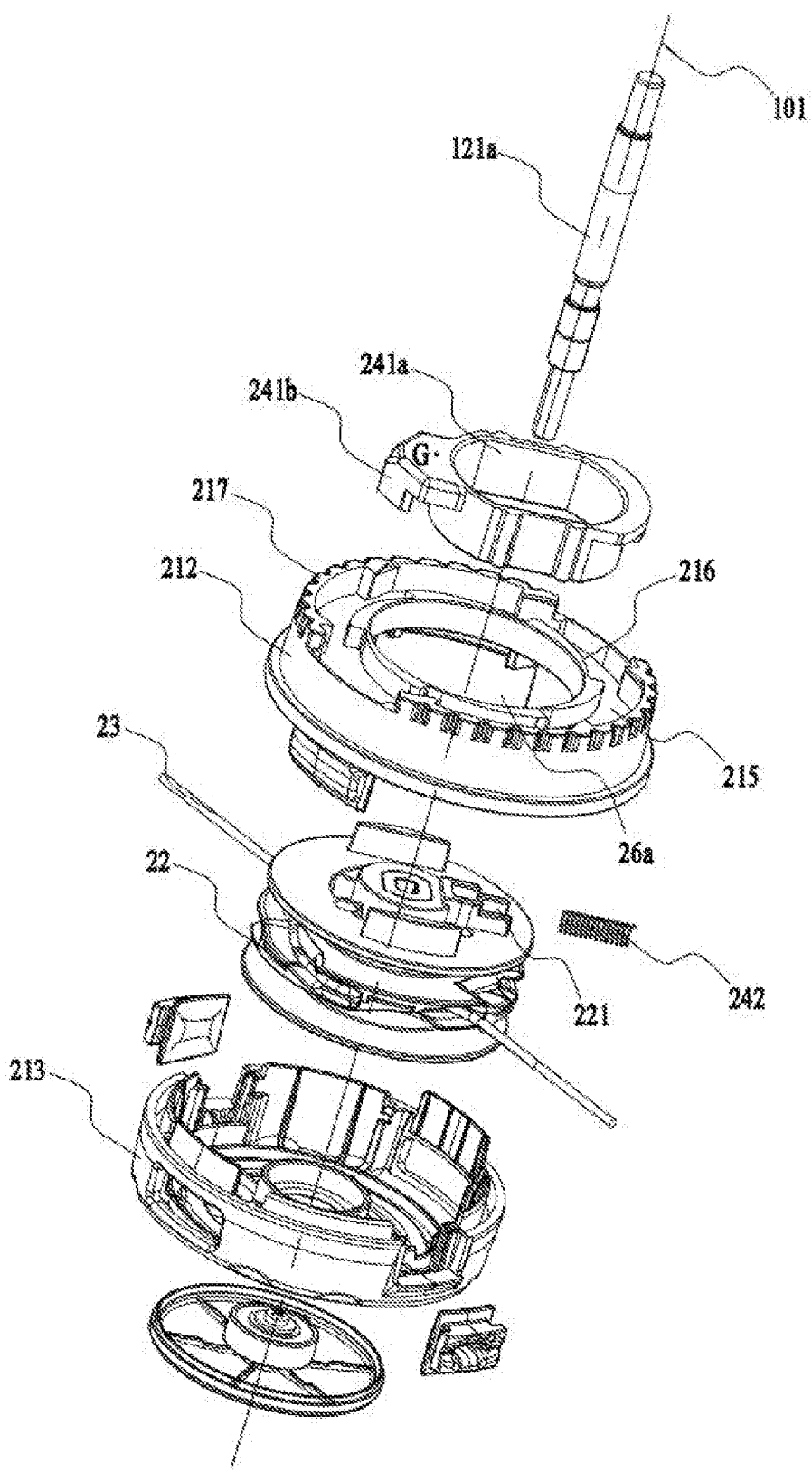
FIG. 6 is an exploded view of the structure shown in FIG. 4.

As shown in FIGS. 2 to 3, the grass trimmer device 12 includes a grass trimmer head 20, a motor 121 and a motor housing 122. The grass trimmer head 20 is used for trimming, and the motor 121 includes a motor shaft 121a for driving the grass trimmer head 20 to rotate. The motor shaft 121a can rotate about a first axis 101, and the motor housing 122 is used for accommodating the motor 121.

The connecting device 13 is used for connecting the operating device 11 and the grass trimmer device 12 so that the operating device 11 and the grass trimmer device 12 constitute a whole that can move together and form the grass trimmer 100. Specifically, the connecting device 13 includes a connecting rod 131. One end of the connecting rod 131 is connected to the motor housing 122, and the other end of the connecting rod 131 may be connected to the rear housing 114 of the operating device 11. The auxiliary handle 112 is also mounted to the connecting rod 131, and the auxiliary handle 112 may also be located between the rear housing 114 and the motor housing 122.

The grass trimmer device 12 further includes a fan 123 which is at least partially disposed between the motor 121 and the grass trimmer head 20. The fan 123 is mounted to the motor shaft 121a and rotates together with the motor shaft 121a to dissipate heat from the motor 121.

The grass trimmer head 20 further includes a housing 21, a spool 22, a grass trimmer line 23 and a line feeding device 24. An accommodating cavity 211 is formed around the housing 21. One side of the housing 21 forming the accommodating cavity 211 is an inner side of the housing 21, and the other side of the housing 21 opposite the inner side is an outer side.

As shown in FIG. 4 to FIG. 8, the housing 21 may specifically include an upper housing portion 212 and a lower housing portion 213, and the upper housing portion 212 and the lower housing portion 213 are integrally formed by a snap connection. The upper housing portion 212 and the lower housing portion 213 are connected to form the accommodating cavity 211 when connected. The spool 22 is at least partially disposed in the accommodating cavity 211, that is, the spool 22 is disposed inside the housing 21. The spool 22 is used for winding the grass trimmer line 23 around, and the grass trimmer line 23 is used for trimming. The housing 21 is further formed with an aperture 214 for the grass trimmer line 23 to protrude to the outside of the housing 21, and the number of apertures 214 is two. The part of the grass trimmer line 23 protruding through the apertures 214 to the outside of the housing 21 is defined as an effective part 231 of the grass trimmer line 23. The effective part 231 of the grass trimmer line 23 is capable of cutting weeds when rotating at a high speed. In order to achieve trimming a certain range of weeds, it is also expected that the length of the effective part 231 of the grass trimmer line 23 can reach a preset value, that is, the length of the effective part 231 of the grass trimmer line 23 is necessary to be greater than or equal to the preset value. The preset value of the grass trimmer line 23 here may be a fixed value, or may of course be a variable value set by a user in advance.

The line feeding device 24 is used for controlling whether the grass trimmer head 20 is releasing the grass trimmer line. The line feeding device 24 has a first working mode that makes the grass trimmer head 20 unable to release the grass trimmer line, and the first working mode may also be considered as a trimming mode. The line feeding device 24 also has a second working mode that enables the grass trimmer head 20 to release the grass trimmer line, and the second working mode may also be considered as a grass trimmer line releasing mode. In response to determining that the line feeding device 24 is in the first working mode, the spool 22 and the housing 21 are relatively stationary. In this way, the spool 22 and the housing 21 will be driven by the motor shaft 121a to rotate synchronously, so that the length of the effective part 231 of the grass trimmer line 23 wound on the spool 22 at this time protruding outside the housing 21 does not change, that is, the grass trimmer line 23 cannot be released, and the grass trimmer head 20 is in a normal working state at this time. In response to determining that the line feeding device 24 is in the second working mode, the spool 22 moves relative to the housing 21, so that the grass trimmer line 23 drives, under the action of the centrifugal force, the spool 22 to rotate relative to the housing 21, so that the grass trimmer line 23 is released, and the length of the effective part 231 of the grass trimmer line 23 will be increased.

Figure 12:
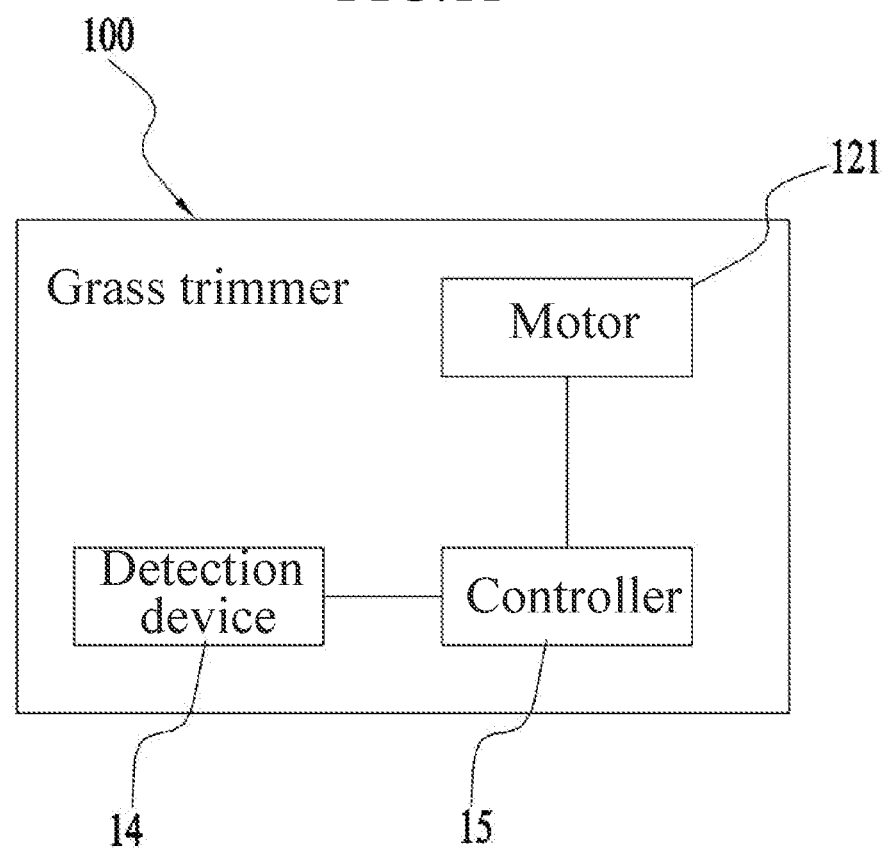
FIG. 12 is a control diagram of the grass trimmer of FIG. 1.

In the present disclosure, as shown in FIG. 12, the grass trimmer 100 further includes a detection device 14 and a controller 15. The detection device 14 may be disposed on the grass trimmer device 12 and the controller 15 may be disposed on the operating device 11, and of course, the present disclosure is not limited thereto. The detection device 14 is configured to detect the length of the effective part 231 of the grass trimmer line 23. Specifically, the detection device 14 detects a characterization parameter of the grass trimmer 100 that can characterize the length of the effective part 231 of the grass trimmer line 23. For example, the characterization parameter may be the length of the grass trimmer line 23 directly, or may also be the current flowing through the motor 121, or the torque of the grass trimmer line 23, or the noise near the grass trimmer head 20. When the length of the effective part 231 of the grass trimmer line 23 changes, the value of the characterization parameter detected by the detection device 14 also changes accordingly, and when the length of the effective part 231 of the grass trimmer line 23 is less than the preset value described above, the value of the characterization parameter also changes to a corresponding value corresponding to the preset value. At this time, the change of the characterization parameter can reflect that the length of the effective part 231 is less than or equal to the preset value. The controller 15 is connected to the detection device 14, and the detection device 14 can send the detected value of the characterization parameter to the controller 15, and the controller 15 stores a correspondence relationship between the characterization parameter and the length of the effective part 231. In this way, the controller 15 may compare a measured value of the received characterization parameter with a stored corresponding value. In response to determining that the characterization parameter reflects that the length of the effective part 231 of the grass trimmer line 23 is less than the preset value, the controller 15 controls the line feeding device 24 to switch to the second working mode, that is, to the grass trimmer line releasing mode. At this time, for the grass trimmer line 23, the length of the effective part 231 is increased under the action of the centrifugal force, and thereby the grass trimmer line is released; or in response to determining that the characterization parameter reflects that the length of the effective part 231 of the grass trimmer line 23 is equal to the preset value, the controller 15 controls the line feeding device 24 to switch to the second working mode.

Of course, if the detection device 14 can directly detect the length of the effective part 231, the detection device 14 may directly send the detected length of the effective part 231 to the controller 15. In this way, in response to determining that the controller 15 determines that the length of the effective part 231 detected by the detection device 14 is less than or equal to the preset value, the line feeding device 24 is controlled to switch to the second working mode. Alternatively, the detection device 14 may be not required to detect the length of the effective part 231 of the grass trimmer line 23, but directly detect whether the length of the effective part 231 of the grass trimmer line 23 is less than or equal to a preset value, for example, the detection device 14 can emit a beam of laser line passing through the grass trimmer line 23, and the intersection between the laser line and the grass trimmer line 23 is exactly the position of the preset value of the effective part 231 of the grass trimmer line 23. If the laser beam is obstructed by the grass trimmer line 23, it can be determined that the length of the effective part 231 is greater than or equal to the preset value. If the laser beam is not obstructed by the grass trimmer line 23, it can be determined that the length of the effective part 231 is less than the preset value.

In this example, as shown in FIGS. 3 to 7, the line feeding device 24 specifically includes a movable block 241 disposed between the spool 22 and the housing 21. In this example, the motor shaft 121a and the spool 22 rotate synchronously. For example, in this example, the motor shaft 121a is in flat fit with the spool 22. When the motor 121 operates, the motor shaft 121a is capable of driving the spool 22 to rotate synchronously with the motor shaft 121a itself. The movable block 241 is formed with a transmission hole 241a. Through the transmission hole 241a, the movable block 241 is sleeved on the spool 22, and can respond to the rotation of the spool 22 to rotate synchronously with the spool 22. The movable block 241 is asymmetric about the first axis 101 in mass distribution. Further, the center of gravity G of the movable block 241 deviates from the first axis 101. A biasing member 242 is further provided between the movable block 241 and the spool 22, and the biasing member 242 is specifically a coil spring. Specifically, an accommodating groove 221 is extendingly formed on the spool 22, and the coil spring is at least partially disposed in the accommodating groove 221. One end of the coil spring abuts against the groove bottom of the accommodating groove 221, and the other end of the coil spring abuts against the movable block 241. The center of gravity of the movable block 241 and the biasing member 242 are disposed on two sides of a plane passing through the first axis 101 and perpendicular to a first straight line 102. The movable block 241 is also slidably connected to the spool 22. When the movable block 241 rotates with the spool 22, the movable block 241 will generate a centrifugal force. At the same time, the movable block 241 is subjected to a biasing force of the biasing member 242. The directions of the biasing force and the centrifugal force are opposite. Further, the directions of the centrifugal force and the biasing force may both be in the direction of the first straight line 102, and the direction in which the movable block 241 is slidably connected to the spool 22 may also be along the direction of the first straight line 102. When the motor 121 operates at a first rotation speed n1 that enables the grass trimmer 100 to be in a normal trimming state, the biasing force of the biasing member 242 on the movable block 241 can be balanced with the centrifugal force generated by the movable block 241, so that the movable block 241 at this time is stationary relative to the spool 22; and when the motor 121 accelerates from the first rotation speed n1, the biasing force of the biasing member 242 on the movable block 241 will be insufficient to be balanced with the centrifugal force generated by the movable block 241, so that the movable block 241 will slide, under the action of the centrifugal force, in the direction of the first straight line 102 relative to the spool 22.

Figure 7:
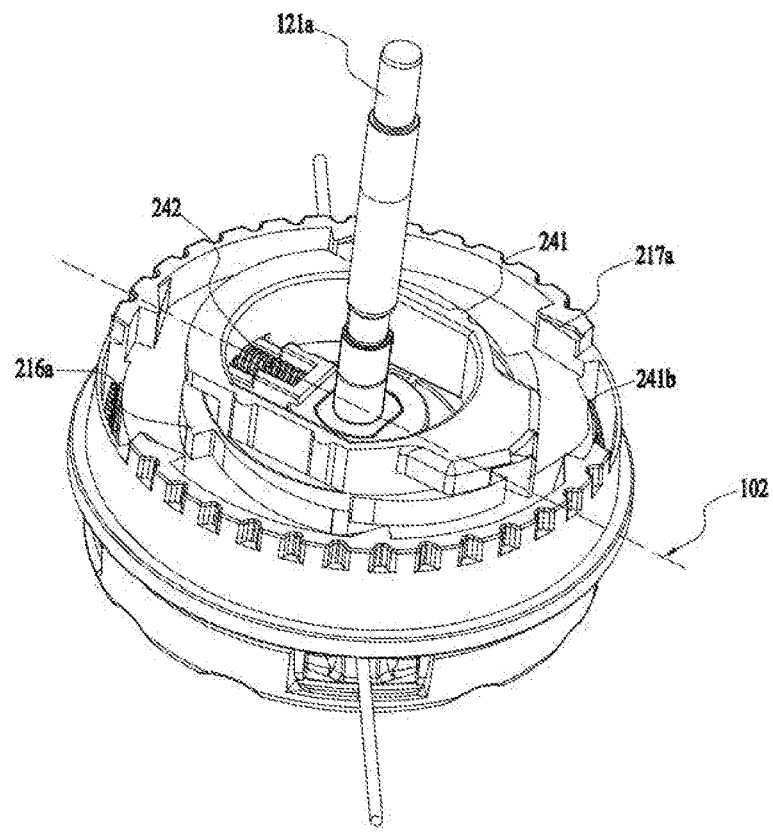
FIG. 7 is a perspective view of the structure shown in FIG. 4.
Figure 8:
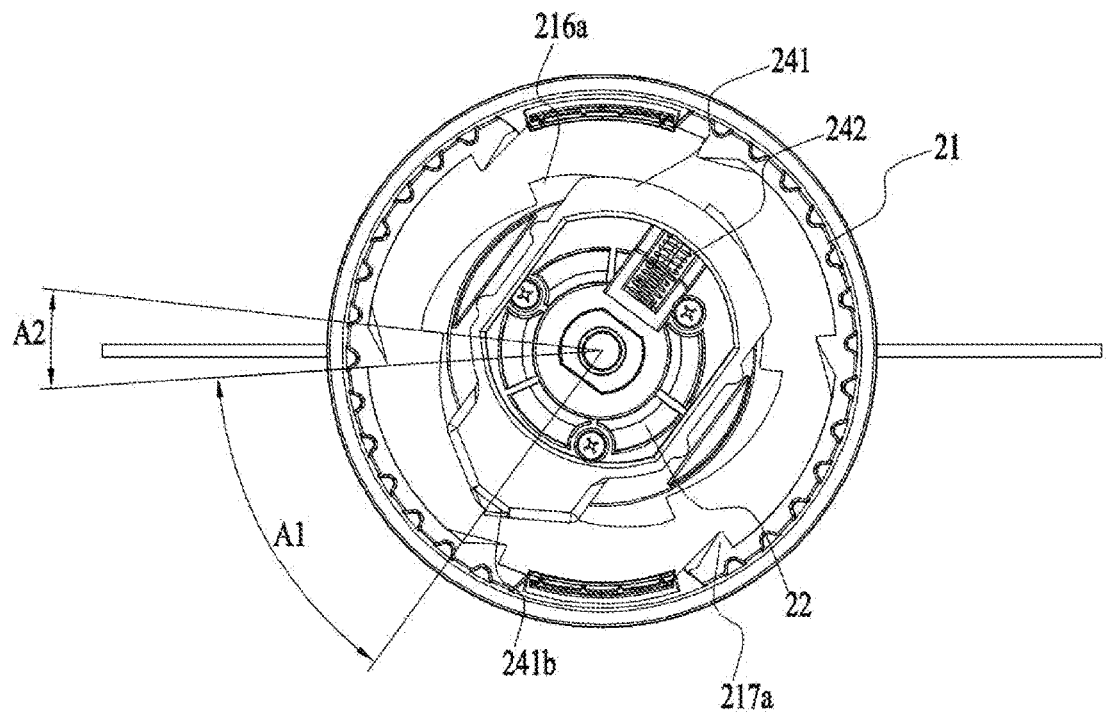
FIG. 8 is a top view of the structure shown in FIG. 4.
Figure 9:
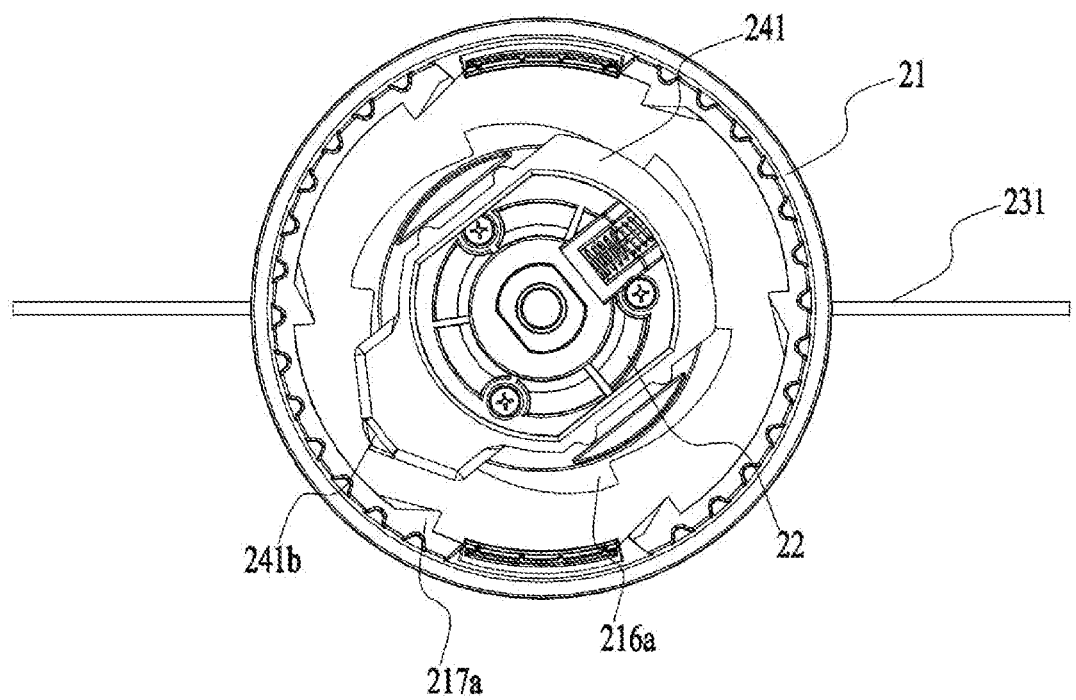
FIG. 9 is a top view of the structure shown in FIG. 4 when an occlusal tooth is separated from an internal tooth and an external tooth.

In this example, the housing 21 is formed with the above accommodating cavity 211 around the first axis 101, the spool 22 is disposed in the accommodating cavity 211 formed by the housing 21, and the movable block 241 is partially located in the accommodating cavity 211 and partially protrudes outside the accommodating cavity 211. Specifically, one end of the housing 21 facing toward the motor 121 along the direction of the first axis 101 is formed with an upper bottom portion 215, the motor shaft 121a penetrates the upper bottom portion 215 into the accommodating cavity 211, and the movable block 241 partially protrudes outside the housing 21. The upper bottom portion 215 facing toward the motor 121 is formed with an inner ring 216 and an outer ring 217, and the inner ring 216 and the outer ring 217 are both formed around the first axis 101. The inner ring 216 is formed around the first axis 101 with a central hole 26a through which the motor shaft 121a passes, and the movable block 241 is at least partially disposed in the central hole 26a. The inner ring 216 protrudes toward the outer ring 217 to form external teeth 216a, and the outer ring 217 protrudes toward the inner ring 216 to form internal teeth 217a. Multiple internal teeth 217a are provided, and multiple external teeth 216a are provided. In the circumferential direction around the first axis 101, the internal tooth 217a and the external tooth 216a are staggered from each other, that is, the internal tooth 217a and the external tooth 216a are not disposed in the same diameter direction perpendicular to the first axis 101. The movable block 241 is formed with an engagement portion that can cooperate with the internal tooth 217a or the external tooth 216a. The engagement portion is specifically an occlusal tooth 241b. In this case, the internal tooth 217a and the external tooth 216a are a reception portion for receiving the occlusal tooth 241b. As shown in FIG. 7 and FIG. 8, when the occlusal tooth 241b of the movable block 241 is engaged with the external tooth 216a or the internal tooth 217a, the movable block 241 makes the housing 21 stationary relative to the spool 22. That is, no relative movement exists between the spool 22 and the housing 21 at this time, it can be considered that the line feeding device 24 at this time is in the first working mode, and the grass trimmer 100 is in a normal trimming state. As shown in FIG. 9, when the occlusal tooth 241b of the movable block 241 is detached from the external tooth 216a or the external tooth 216a, the movable block 241 is in a free state relative to the housing 21, and the spool 22 is also in a free state relative to the housing 21. That is to say, at this time, the spool 22 can move relative to the housing 21, and it can be considered that the line feeding device 24 is in the second working mode at this time, that is, in the grass trimmer line releasing mode. At this time, the spool 22 can move relative to the housing 21 under the action of the centrifugal force of the grass trimmer line 23, so that the length of the effective part 231 of the grass trimmer line 23 protruding outside of the housing 21 can be increased.

When the motor 121 drives, at the first rotation speed n1, the spool 22 to rotate, the movable block 241, under the action of the biasing force of the biasing member 242, causes the occlusal tooth 241b to be engaged with the external tooth 216a on the inner ring 216, so that the line feeding device 24 is in the first working mode, the housing 21 is stationary relative to the spool 22, and the length of the effective part 231 of the grass trimmer line 23 protruding outside the housing 21 is fixed; when the motor 121 accelerates from the first rotation speed n1, the centrifugal force generated by the movable block 241 will overcome the biasing force of the biasing member 242 on the movable block 241, and the movable block 241 will slide relative to the spool 22 along the first straight line 102 to make the occlusal tooth 241b detached from the external tooth 216a on the inner ring 216. At this time, the housing 21 will not be driven by the movable block 241, which makes the line feeding device 24 is in the second working mode, so that the spool 22 can move relative to the housing 21 at this time, and then the length of the effective part 231 of the grass trimmer line 23 is increased under the action of the centrifugal force to achieve the purpose of releasing the grass trimmer line.

Figure 10:
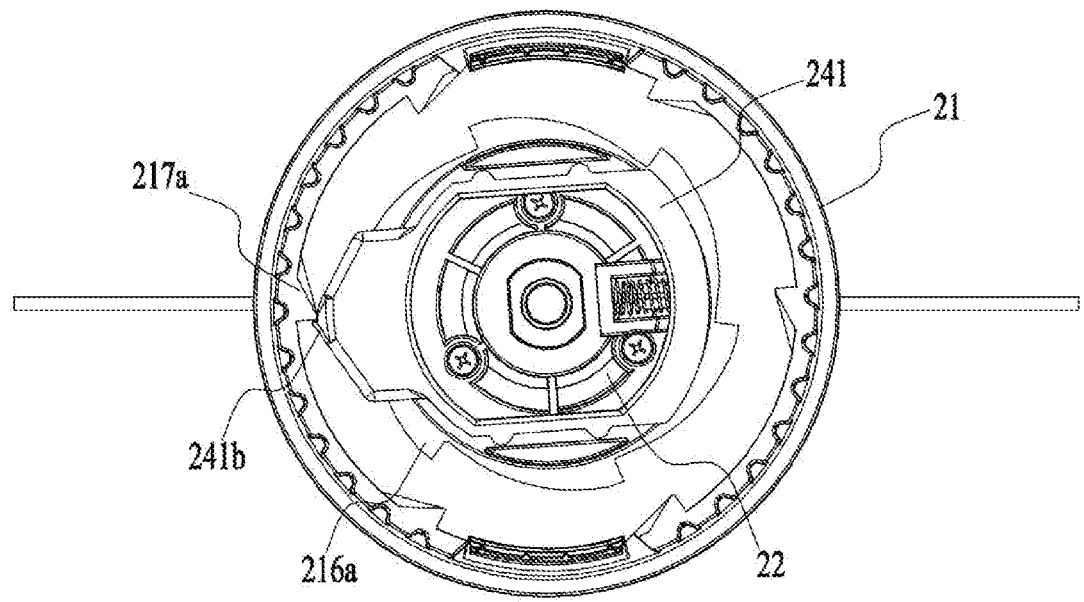
FIG. 10 is a top view of the structure shown in FIG. 4 when an occlusal tooth is engaged with an internal tooth.
Figure 11:
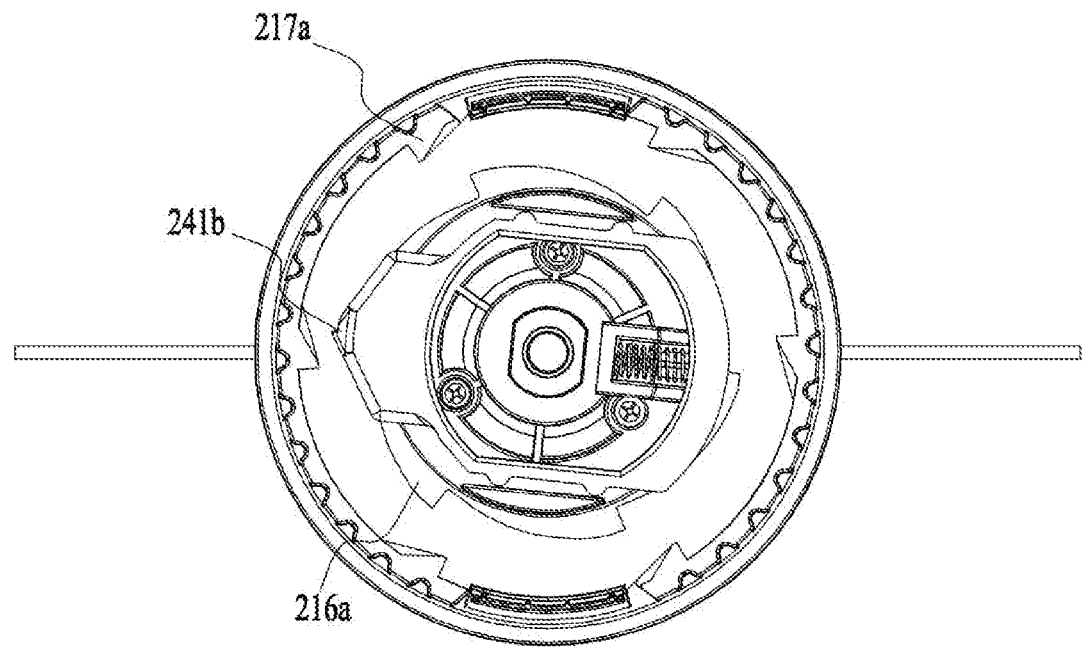
FIG. 11 is a top view of the structure shown in FIG. 4 when a movable block is engaged with an external tooth again after a certain angle is rotated.

In response to determining that the detection device 14 detects that the length of the effective part 231 of the grass trimmer line 23 is less than the preset value, the line feeding device 24 can switch to the second working mode, so that the controller 15 is also connected to the detection device 14. In this way, in response to determining that the detection device 14 detects that the length of the effective part 231 of the grass trimmer line 23 is less than the preset value, the controller 15 controls the motor 121 to accelerate from the first rotation speed n1, and when the motor 121 accelerates, the line feeding device 24 can switch to the second working mode. At this time, under the action of the centrifugal force, the length of the effective part 231 of the grass trimmer line 23 is increased to achieve the purpose of releasing the grass trimmer line. After the occlusal tooth 241b of the movable block 241 is detached from the external tooth 216a on the inner ring 216, as shown in FIG. 9, the movable block 241 can rotate with the spool 22 relative to the housing 21, and at the same time, the movable block 241 will also slide relative to the spool 22 along the direction of the first straight line 102. The sliding of the movable block 241 relative to the spool 22 and the rotation of the movable block 241 relative to the housing 21 cause a change in the position of the movable block 241 relative to the housing 21 in the circumferential direction around the first axis 101, and also cause a change in the position of the movable block 241 relative to the housing 21 in the diameter direction perpendicular to the first axis 101, as shown in FIG. 10, which enables the movable block 241 to move to a position where the occlusal tooth 241b is engaged with an internal tooth 217a after the occlusal tooth 241b is detached from the external tooth 216a. At this time, the movable block 241 makes the housing 21 stationary relative to the spool 22. Then, the controller 15 can control the motor 121 to decelerate. After the motor 121 decelerates, the movable block 241 will be reset under the action of the biasing force and finally reset to the state in which the occlusal tooth 241b is engaged with another internal tooth 217a as shown in FIG. 11. The process in which the movable block 241 moves from the engagement of the occlusal tooth 241b with one external tooth 216a to the engagement of the occlusal tooth 241b with one internal tooth 217a may be considered as the line feeding device 24 being in the second working mode. In this process, the whole formed by the movable block 241 and the spool 22 rotate a first angle A1 relative to the housing 21 and the first angle A1 may be greater than 40 degrees; and in the process in which the movable block 241 is reset from the engagement of the occlusal tooth 241b with the internal tooth 217a to the engagement of the movable block 241 with another external tooth 216a, the movable block 241 and the spool 22 rotate a second angle A2 relative to the housing 21. The second angle A2 is smaller than the first angle A1, and the difference between the second angle A2 and the first angle A1 may be more than 30 degrees. Specifically, the second angle A2 is smaller than 20 degrees, which makes the length of the effective part 231 of the grass trimmer line 23 protruding outside housing 21 not be increased or increase less.

Figure 13:
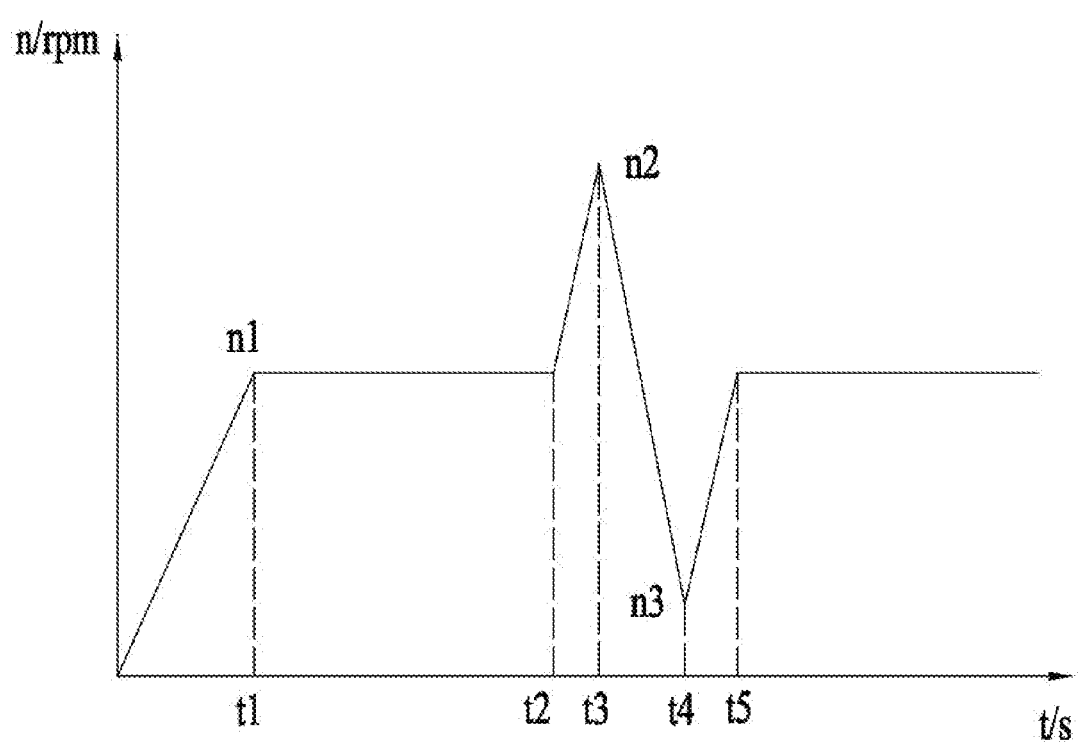
FIG. 13 is a graph illustrating a rotation speed of a motor of the grass trimmer of FIG. 1.
Figure 14:
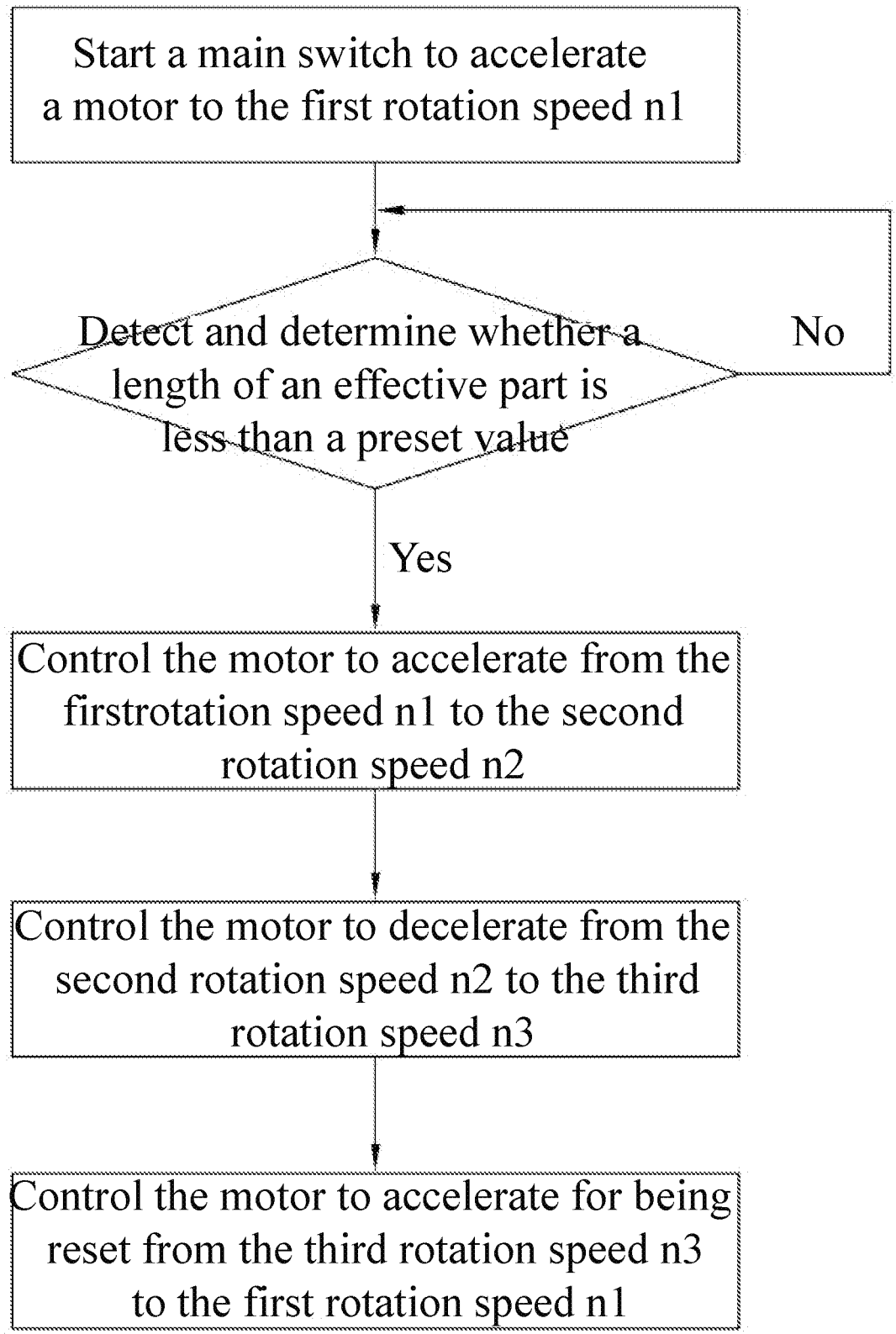
FIG. 14 is a flowchart of a control method for the grass trimmer of FIG. 1.

As shown in FIGS. 1, 13 and 14, a control method for a grass trimmer 100 includes the steps described below.

The motor 121 is started by the main switch 113 to accelerate to the first rotation speed n1. When the user triggers the main switch 113, the motor 121 starts to accelerate. After a period of time of t1, the motor 121 accelerates to the first rotation speed n1, and then the motor 121 will operate at the first rotation speed n1. At this time, the line feeding device 24 is in the first working mode, the spool 22 and the housing 21 are in a relatively stationary state, and the grass trimmer 100 is in the normal trimming state.

It is detected and determined whether the length of the effective part 231 is less than a preset value. Specifically, the detection device 14 may directly detect the length of the effective part 231 of the grass trimmer line 23 and then send the length to the controller 15. The controller 15 determines whether the length of the effective part 231 is less than the preset value. If the length of the effective part 231 is less than the preset value, the process proceeds to the next step, otherwise, the detection is continued. Alternatively, the detection device 14 may also directly detect and determine whether the length of the effective part 231 is less than the preset value without detecting the specific value of the length of the effective part 231. For example, the detection device 14 can emit a beam of laser line that can pass through the grass trimmer line 23. The intersection between the laser line and the grass trimmer line 23 is exactly the position of the preset value of the effective part 231 of the grass trimmer line 23. If the laser line and the grass trimmer line 23 do not have the intersection, the laser line will not be obstructed by the grass trimmer line 23. At this time, it can be determined that the length of the effective part 231 of the grass trimmer line 23 is less than the preset value. If the laser line and the grass trimmer line 23 have the intersection, the laser line is obstructed by the grass trimmer line 23 to make the light intensity of the laser line to be weakened. It can be determined that the length of the grass trimmer line 23 is greater than or equal to the preset value. In this example, those skilled in the art can understand that it may also be detected and determined whether the length of the effective part 231 is equal to the preset value for accurate detection and determination.

Figure 15:
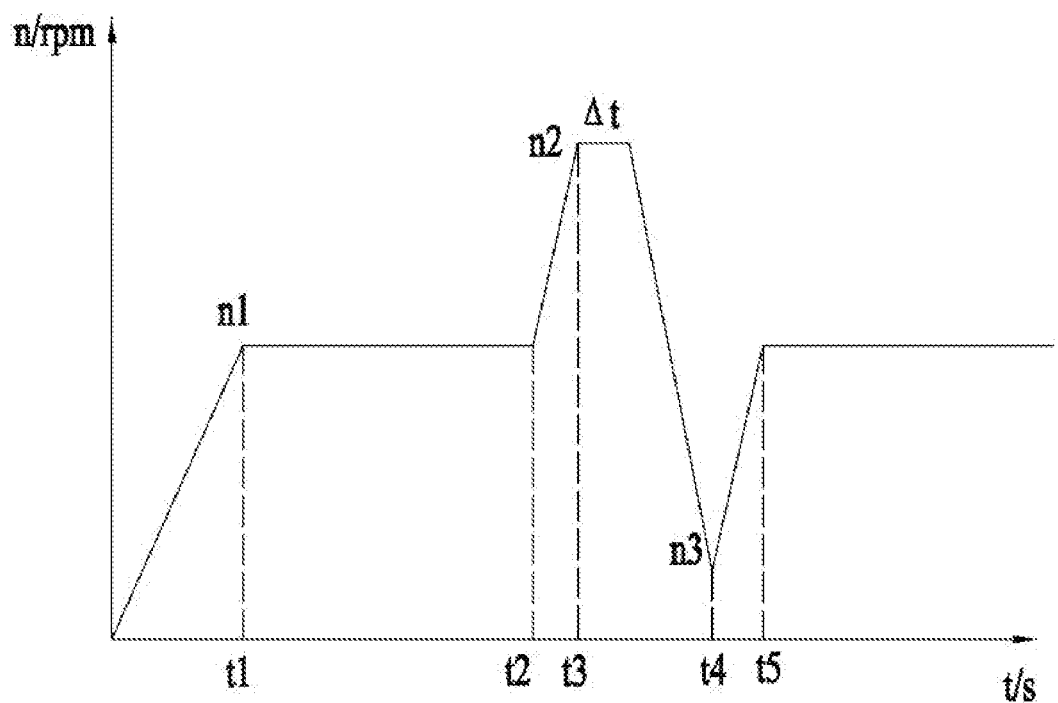
FIG. 15 is another graph of a rotation speed of a motor of the grass trimmer of FIG. 1.

The motor 121 is controlled to accelerate from the first rotation speed n1 to the second rotation speed n2. After the grass trimmer 100 starts trimming for a period of time from time t1, that is, to time t2, the length of the effective part 231 of the grass trimmer line 23 is less than or equal to the preset value at time t2 due to wear and tear. The controller 15 controls the motor 121 to accelerate to the second rotation speed n2 at this time, so that the line feeding device 24 switches to the second working mode, that is, to the grass trimmer line releasing mode, so that the length of the effective part 231 of the grass trimmer line 23 will be increased. As shown in FIG. 15, the controller 15 may also control the motor 121 to accelerate to the second rotation speed n2, and to operate at the second rotation speed n2 for Δt time, so as to ensure that the length of the grass trimmer line 23 released can reach the user demand.

The motor 121 is controlled to decelerate from the second rotation speed n2 to the third rotation speed n3. When the motor 121 accelerates to the second rotation speed n2 at time t3, the grass trimmer line 23 has completed the grass trimmer line releasing work. At this time, the controller 15 controls the motor 121 to start deceleration and decelerate to the third rotation speed n3 at time t4. The third rotation speed n3 is smaller than the second rotation speed n2, and the third rotation speed n3 is smaller than or equal to the first rotation speed n1. In this example, further, the third rotation speed n3 is smaller than the first rotation speed n1, so that the biasing force of the biasing member 242 on the movable block 241 can be greater than the centrifugal force received by the movable block 241, so that the movable block 241 can be quickly reset. The first rotation speed n1 is greater than 5000 rpm, the second rotation speed n2 is greater than 6000 rpm, and the third rotation speed n3 is smaller than 3000 rpm. The difference between the third rotation speed n3 and the second rotation speed n2 is also greater than the difference between the second rotation speed n2 and the first rotation speed n1, which can further ensure that the movable block 241 can be quickly reset.

The motor 121 is controlled to accelerate for being reset from the third rotation speed n3 to the first rotation speed n1. Finally, the controller 15 can control the motor 121 to reset to the first rotation speed n1, and then, the grass trimmer 100 continues trimming.

Figure 16:
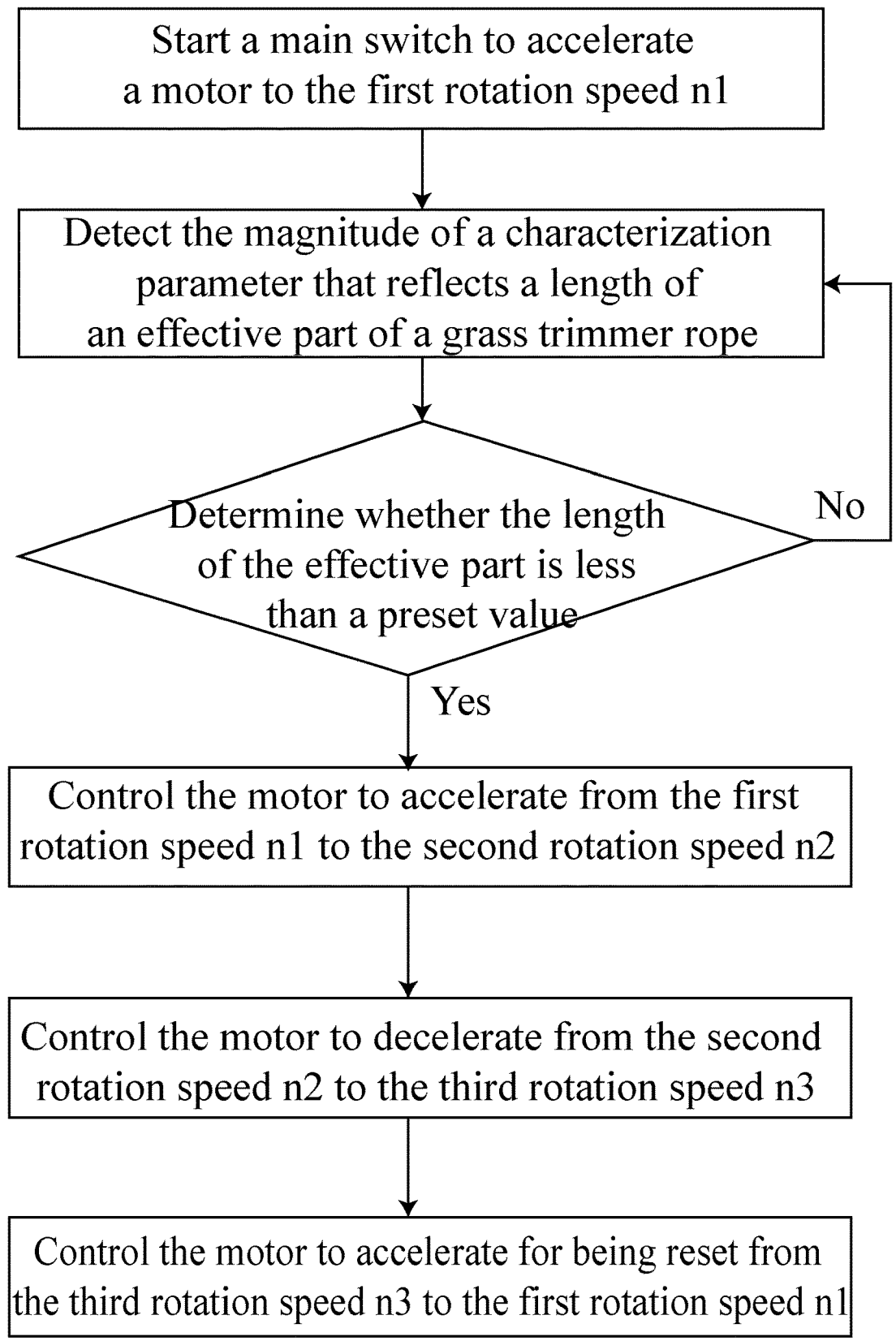
FIG. 16 is a flowchart of another control method for the grass trimmer of FIG. 1.

As shown in FIG. 16, the control method for the grass trimmer 100 may also include the steps described below.

The main switch 113 is started to accelerate the motor 121 to the first rotation speed n1.

The magnitude of the characterization parameter that reflects the length of the effective part 231 of the grass trimmer line 23 is detected. In this example, the detection device 14 can detect the magnitude of the characterization parameter capable of reflecting the length of the effective part 231 of the grass trimmer line 23, thereby achieving indirect measurement of the length of the effective part 231 of the grass trimmer line 23. The characterization parameter may be a current flowing through the motor 121, a torque of the grass trimmer line 23, or a noise near the grass trimmer head 20.

It is determined whether the length of the effective part 231 is less than the preset value. The detection device 14 sends the measured characterization parameter to the controller 15, and the controller 15 compares the measured value of the characterization parameter with a stored corresponding value corresponding to the length of the effective part 231. If the value of the characterization parameter can reflect the length of the effective part 231 is less than the preset value, the process proceeds to the next step, otherwise, the process returns to the previous step. In this example, those skilled in the art can understand that it may also be detected and determined whether the length of the effective part 231 is equal to a preset value for accurate detection and determination.

The motor 121 is controlled to accelerate from the first rotation speed n1 to the second rotation speed n2. Similarly, in this example, the controller 15 can also control the motor 121 to accelerate to the second rotation speed n2, and to operate at the second rotation speed n2 for a period of time, thereby ensuring the length of the grass trimmer line 23 released satisfy the needs for use.

The motor 121 is controlled to decelerate from the second rotation speed n2 to the third rotation speed n3.

The motor 121 is controlled to accelerate for being reset from the third rotation speed n3 to the first rotation speed n1.

The basic principles, main features, and advantages of the present disclosure have been shown and described above. Those skilled in the art should understand that the above examples do not limit the present disclosure in any form, and that any technical solution obtained by means of equivalent substitution or equivalent transformation falls within the protection scope of the present disclosure.

What is claimed is:

1. A grass trimmer, comprising:
an operating device configured for a user to operate; and
a grass trimmer head; and
a motor configured to drive the grass trimmer head,
wherein the grass trimmer head comprises:
a spool, configured for a grass trimmer line to wind around, capable of rotating around a first axis; and
a housing formed with an accommodating cavity configured to accommodate at least a part of the spool and formed with an aperture configured for the grass trimmer line to pass through,
wherein when the grass trimmer is mounted with the grass trimmer line, a part of the grass trimmer line protruding outside the housing is defined as an effective part of the grass trimmer line,
wherein the grass trimmer further comprises:
a controller configured to control the grass trimmer head to release the grass trimmer line when the grass trimmer head is mounted with the grass trimmer line and a length of the effective part is detected to be less than or equal to a preset value; and
a line feeding device configured to have a first working mode for preventing the grass trimmer head from releasing the grass trimmer line and a second working mode for allowing the grass trimmer head to release the grass trimmer line,
wherein the controller is connected to the motor, and the controller is capable of controlling the motor to accelerate from a first rotational speed at which the grass trimmer is in a normal trimming state to a second rotational speed so as to switch the grass trimmer head from the first working mode to the second working mode, and
wherein the line feeder comprises a movable block capable of rotating with rotation of the spool and sliding along a direction of a first straight line relative to the spool, the movable block is formed with an engagement portion, the housing is formed with a reception portion capable of cooperating with the engagement portion to cause the housing and the spool relatively stationary, when the line feeder is in the first working mode, the movable block slides to a position where the engagement portion and the reception portion cooperate with each other, when the line feeder is in the second working mode, the movable block slides to a position where the engagement portion and the reception portion are separated from each other.

2. The grass trimmer of claim 1, wherein, when the line feeding is in the first working mode, the housing is stationary relative to the spool and the grass trimmer head is capable of trimming grass, and, when the line feeding device is in the second working mode, the spool rotates relative to the housing and the grass trimmer head releases the grass trimmer line.

3. The grass trimmer of claim 1, further comprising a detector configured to detect a characterization parameter that reflects a change in the length of the effective part when the grass trimmer line is mounted to the grass trimmer, wherein the controller is connected to the detector and, when the characterization parameter reflects that the length of the effective part is less than or equal to the preset value, the controller controls the grass trimmer head to release the grass trimmer line.

4. The grass trimmer of claim 3, wherein a correspondence relationship between the characterization parameter and the length of the effective part is stored in the controller.

5. The grass trimmer of claim 4, wherein the characterization parameter is at least one of a current flowing through the motor, a torque of the grass trimmer line, and a noise outside the housing of the grass trimmer head.

6. The grass trimmer of claim 1, wherein the reception portion is formed on an outer side of the housing facing toward the motor and the movable block is at least partially disposed outside the accommodating cavity.

7. The grass trimmer of claim 1, wherein the line feeding device comprises a biasing member configured to bias the movable block to move toward the position where the engagement portion and the reception portion cooperate with each other.

8. The grass trimmer of claim 7, wherein a center of gravity of the movable block and the biasing member are respectively disposed on two sides of a plane passing through the first axis and perpendicular to the first straight line.

9. The grass trimmer of claim 1, further comprising a detector configured to detect the length of the effective part, wherein the detection device is connected to the controller, and, when the length of the effective part detected by the detection device is less than or equal to the preset value, the controller controls the grass trimmer head to release the grass trimmer line.

10. The grass trimmer of claim 1, further comprising a detector configured to detect whether the length of the effective part is less than or equal to the preset value, wherein the controller is connected to the detector, and, in response to determining that the detector device detects that the length of the effective part is less than or equal to the preset value, the controller controls the grass trimmer head to release the grass trimmer line.

11. The grass trimmer of claim 10, wherein, when the controller controls the motor to decelerate from the second rotation speed to a third rotation speed, the grass trimmer head is switched from the second working mode to the first working mode.

12. The grass trimmer of claim 11, wherein the third rotational speed is smaller than or equal to the first rotation speed.

13. The grass trimmer of claim 11, wherein the first rotational speed is greater than 5000 rpm.

\* \* \* \* \*